Patented June 28, 1927.

1,633,737

UNITED STATES PATENT OFFICE.

FREDERICK KNAPP FISH, JR., OF SAN FRANCISCO, CALIFORNIA.

LIQUOR FOR TREATING PLANT MATERIAL AND PROCESS OF PRODUCING THE SAME.

No Drawing. Application filed May 24, 1926. Serial No. 111,457.

This invention relates to a liquor for treating plant material and, more particularly, wood in the production of pulp, and to a process for producing such liquor.

Various liquors have been proposed for the treatment of wood in the production of pulp and the characteristic functions required of a particular liquor are well known in the art. The substances which hold the fibre together in a block or chip of wood must be softened, dissolved or removed so as to permit the liberation of such fibre. In accomplishing such liberation of the fibre it is important to avoid the formation or retention of substances, which tend to impart a dark colour to the product, which tend to weaken the fibre produced or which tend to decrease the yield of pulp formed. Moreover, from an economical point of view, it is desirable to decrease as much as possible the time required for treating the wood. Furthermore, it has been found that the time element has a considerable influence on the treatment of wood and this is thought to be due to the many chemical reactions which may take place in such treatment. These reactions are so complex and relatively so little is known of them that it is difficult and practically impossible to specifically define the particular reactions which take place or which are avoided in the successful treatment of wood. It has, however, been found that improved results are obtained when certain conditions are maintained in the treatment of the wood.

It is thus an object of this invention to provide a new composite liquor for the treatment of wood, which is adapted to facilitate the successful treatment of the wood and to produce a desirable character of pulp. By the use of this new liquor I have been able to reduce the time required for treating the wood and at the same time secure the desired strength of fibre and colour in the pulp produced.

Briefly stated, this new liquor is produced by dissolving sodium carbonate in water charged with volatile and other solvent extractives derived from wood, circulating sulphur dioxide through such solution until the desired quantity thereof is absorbed thereby, and adding sulphur thereto.

By volatile and other solvent extractives, I mean the substances which are removed from wood by its treatment with liquor and evolved in the form of vapor or in solution in the particular solvent employed. Obviously the specific composition of these extractives will vary with the particular wood being treated and the liquor employed but I have found them to be valuable constituents of wood treating liquors.

Thus the water, used as a solvent in this invention in preparing the treating liquor, may be water into which there is initially charged vapors evolved in the treatment of wood with a cooking liquor and extractives in solution in the liquor or it may be a liquor which has been previously used and in which the volatile extractives have been recovered.

In this charged water there is dissolved soda ash in the proportions required for the particular character of wood to be treated. The solution formed preferably contains seven to thirteen per cent by weight of the soda ash. Sulphur dioxide is caused to combine with this solution preferably to the extent of six to ten per cent by weight and elemental sulphur is added and caused to combine with the solution. The complete reactions taking place in the operation of this process are not known but for the treatment of some wood it has been found desirable to have an excess of soda ash with respect to the sulphur dioxide used and it is thought that the sulphur reacts with at least a portion of this excess soda ash. The amount of sulphur added is preferably not sufficient to react with all the excess of soda ash present and I find that for certain uses the sulphur may be omitted from the liquor. In causing the incorporation of the sulphur in the solution it has been found preferable to raise the temperature above the boiling point of the solution and the pressure to forty to one hundred pounds. Under these conditions the sulphur is readily incorporated into the solution.

While I have described this liquor with particular reference to the treatment of wood it is to be understood that it is applicable to the treatment of plant material in general for the liberation of the plant fibre.

It will be apparent that various changes may be made in my invention as herein defined without departing from the spirit of the invention as claimed.

What I claim is:—

1. A process of making liquor for treating plant material, which comprises dissolving soda ash in water charged with volatile and other solvent extractives of wood and passing sulphur dioxide into the solution so formed.

2. A process of making liquor for treating plant material, which comprises, charging water with volatile and other solvent extractives produced in the treatment of wood, dissolving soda ash in the so charged water, passing sulphur dioxide into said solution and adding sulphur thereto as herein described.

3. A process of making liquor for treating plant material, which comprises forming an aqueous solution with soda ash and sulphur dioxide and incorporating in said solution sulphur at a temperature above its boiling point and at an elevated pressure, as herein described.

4. A liquor for treating plant material, comprising water charged with volatile and other solvent extractives produced in the treatment of wood, sodium carbonate dissolved therein and sulphur dioxide combined with said solution.

5. A liquor for treating plant material, comprising in combination water charged with volatile and other solvent extractives produced in the treatment of wood, sodium carbonate and sulphur dioxide.

6. A liquor for treating plant material, comprising in combination water volatile and other solvent extractives of wood, sodium carbonate, sulphur dioxide and sulphur.

7. A liquor for treating plant material, comprising in combination water volatile and other solvent extractives of wood, soda ash and sulphur dioxide, the soda ash being in excess of the amount required to react with the sulphur dioxide.

In testimony whereof I affix my signature.

FREDERICK KNAPP FISH, Jr.